United States Patent [19] [11] 3,919,153
Fischer [45] Nov. 11, 1975

[54] ADHESIVE COMPOSITIONS

[75] Inventor: Adolf A. Fischer, Fall River, Mass.

[73] Assignee: United Merchants and Manufacturers, Inc., New York, N.Y.

[22] Filed: Oct. 1, 1973

[21] Appl. No.: 401,975

Related U.S. Application Data

[63] Continuation-in-part of Ser. No. 182,272, Sept. 20, 1971, abandoned, which is a continuation-in-part of Ser. No. 831,258, June 6, 1969, abandoned, which is a continuation-in-part of Ser. No. 540,526, April 6, 1966, abandoned.

[52] U.S. Cl. ................ 260/29.4 UA; 260/29.6 RB; 260/29.6 RW; 260/29.6 SQ; 260/851; 260/853; 260/856; 260/897 C

[51] Int. Cl.[2] ........................................ C08L 61/20

[58] Field of Search ........... 260/29.4 UA, 29.6 XA, 260/29.6 RU, 29.6 RW, 29.4 R, 260/29.6 TA, 851, 853, 897 C, 29.6 RB, 260/29.6 SQ, 856

[56] References Cited

UNITED STATES PATENTS

| | | | |
|---|---|---|---|
| 2,519,068 | 8/1950 | Richardson | 260/897 C |
| 2,968,637 | 1/1961 | Bowers | 260/29.6 RB |
| 3,158,665 | 11/1964 | Herbig et al. | 260/897 C |
| 3,228,790 | 1/1966 | Sexsmith et al. | 260/29.6 RU |

*Primary Examiner*—Lorenzo B. Hayes
*Attorney, Agent, or Firm*—Michael A. Caputo; John P. McGann

[57] ABSTRACT

Adhesive compositions in emulsion form for uniting textiles, wood, metal, leather, etc. comprising a halogenerated alpha-mono-olefin polymer solution emulsified with resinous polymers of esters of alpha, beta, ethylenically unsaturated monocarboxylic acids and saturated aliphatic alcohols and a curing agent. There may also be included in the compositions certain aldehyde-containing amine precondensates which increase the toughness of the bond.

4 Claims, No Drawings

ADHESIVE COMPOSITIONS

CROSS-REFERENCE TO RELATED APPLICATIONS

This application is a continuation-in-part of my copending application, Ser. No. 182,272 Sept. 20, 1971, which, in turn, is a continuation-in-part of Ser. No. 831,258, filed June 6, 1969, which in turn is a continuation-in-part of application Ser. No. 540,526, filed Apr. 6, 1966, all now abandoned the contents of each of said prior applications being incorporated herein by reference.

BACKGROUND OF THE INVENTION

1. Field of the Invention

This invention relates to adhesive compositions in general and, more particularly, to improved adhesive emulsion compositions in emulsion form comprising halongenated olefin polymer materials and resinous acrylates.

2. Description of the Prior Art

It has long been a problem, particularly in the textile industry, to provide suitable adhesive materials which will retain their adhesive strength, color, shape, etc. when subjected to the several treatments generally required of textile materials. Materials which have been found suitable to withstand these treatments have been found economically unattractive. Hence, no satisfactory binder for textiles is known in the art which will withstand these treatments as well as the textile materials to which they are applied.

Many attempts have been made heretofore to provide adhesive materials having satisfactory adhesive strength, no tendency to discolor, good washfastness, etc., and thus be suitable for the several conditions to which such adhesive compositions are subjected. While certain of these adhesives purport to provide good bonding strength, washfastness, lack of discoloration, etc., in actual practice they have not exhibited the properties forecast. When subjected to the several situations to which binders for textiles are utilized, these prior art adhesives have shown such shortcomings as insufficient bonding strength, stiffness lack of washfastness, discoloration, and poor resistance to such processes as those employed in modern dry-cleaning plants.

A further disadvantage of certain of these prior adhesive materials has been the requirement for expensive curing procedures after the initial drying step. These extra curing procedures have been carried out either by the use of elevated temperatures or extended setting periods or both. This, of course, is a major economic consideration when commercial production of textile materials involving adhesive binders is contemplated.

It is also known from U.S. Pat. No. 2,968,637 that aqueous dispersions of solid chlorosulfonated hydrocarbon polymers containing a curing agent are useful as coating and adhesive materials and that these dispersions may also contain about 2 to 10 percent based on the weight of the polymer of various compounding agents such as high molecular weight carboxylic acid esters as dispersing agents. However, curing periods for these dispersions range from about 2 hours at 100°C to about 3 minutes in a steam heated oven pressured at 150 p.s.i. with steam. Obviously, such rigid curing conditions are not satisfactory for many textiles as they would be injurious to the fabric.

It is clear therefore that a distinct need remains in the art for adhesive compositions which provide strong bonds and yet can be cured at low temperatures in short time periods.

SUMMARY OF THE INVENTION

It is, accordingly, an object of this invention to provide adhesive materials and compositions which obviate the above-enumerated disadvantages and drawbacks.

A further object of the invention is to provide adhesive compositions in emuslified form which exhibit greatly improved adhesion to substrates, and rapid curing periods under mild conditions, in combination with the further advantages of good washfastness, lack of stiffness, no tendency to discolor, and improved resistance to cleaning procedures employed in dry-cleaning plants.

A still further object of the invention is to provide, as a novel article of manufacture, a fabric containing an adhesive bond employing the compositions described herein. An even more specific object of the invention is to provide a process for adhesively uniting textile fabrics, wood, metal, leather, etc. employing a novel adhesive composition under which only moderate curing conditions are required.

Other objects and advantages of the invention will become apparent as the description thereof proceeds.

In accordance with this invention, the above objects and advantages are achieved by the provision of water-in-oil emulsified adhesive compositions comprising a halogenated alpha-mono-olefin polymer solution emulsified with an acrylic resin and a curing agent. There may also be included in this composition aldehyde containing amine precondensates which increase the toughness of the bond.

Also provided by this invention is a process for the production of the novel adhesive compositions which comprises dissolving the halogenated olefin polymer in an organic solvent and emulsifying thereinto an aqueous solution comprising the curing agent and acrylic resin. The resulting emulsion is then applied to the material to be adhesively bonded and subjected to moderate curing conditions as delineated hereinafter to effect a strong and flexible bond.

DESCRIPTION OF PREFERRED EMBODIMENTS

As pointed out hereinabove, the adhesive compositions of this invention have been found to be particularly suitable for the formation of secure bonds in natural and synthetic textile fabrics as the binders are unexpectedly resistant to the several severe conditions to which textiles are normally subjected both in the production and wear period. It is to be understood, however, that the adhesive compositions of this invention are also useful in bonding of wood, metals, glass, plastics, rubber, leather, paper, synthetic elastomers, etc. A specific area in which the adhesive materials of this invention have been found useful is for bonding the synthetic fabrics now widely employed in the textile industry.

In accordance with this invention, it has been found that compositions having incorporated therein the above-defined materials provide improved bonding compositions having superior adhesive properties and whose resistance to conditions normally endured by textiles both in production and in use is superior over prior-known adhesive materials. The adhesive compositions of this invention have been found, quite unexpectedly, not to exhibit the brittleness, poor washfastness and tendencies to discolor as have these prior adhesives. Moreover, the characteristic of these materials in exhibiting improved fastness to modern dry-cleaning techniques serves to obviate a long-standing problem of the textile industry.

The adhesive compositions of this invention have been found to be applicable in the textile industry as pointed out hereinabove. Thus, the compositions are especially applicable for procedures such as coating or printing as employed in flock applications, or in the common procedures of binding textiles to textiles or to plastic materials or other materials to which textiles are normally bonded. Moreover, after application of the adhesive compositions of the invention, extended curing periods at high temperatures to effect curing of the adhesive have been found to be unnecessary, a factor which constitutes a further unexpected economic advantage.

As pointed out hereinabove, the improved adhesive compositions of this invention comprise compositions containing certain halogenated olefin polymers in combination with certain acrylic resins and a curing agent such as an amine or sulfur-containing amine derivative and optionally an aminoplast curing agent. These ingredients and methods for forming the compositions are specifically described hereinbelow.

The halogenated olefin polymers employed as basic ingredients in the practice of this invention are known in the art, being generally commercially available materials, and may be illustrated broadly by reference to halogenated olefin polymers and halosulfonated olefin polymeric materials. These olefinic polymeric materials may be generally described as halogenated alpha-mono-olefin polymers which may also be substituted by a halosulfonyl group. While the halo substutuent may be any of the halogens, chloro is especially preferred. It is to be understood therefore that the term "halogenated alpha-mono-olefin polymers" is inclusive of polyolefins substituted by one or more halogen atoms and/or one or more halosulfonyl groups.

Specific olefin polymeric materials which fall within the above class and which may be employed in the compositions of this invention, include chlorosulfonated polymers of ethylene, propylene, isobutylene, and the like. Also, there may be mentioned chlorinated polyolefins such as chlorinated polypropylene (available commercially from Hercules Powder Co. as Parlon P which is a film forming chlorinated polypropylene resin containing at least 65% chlorine. It is described in detail in Product Data Sheet No. 108-1 available from the Hercules Powder Company). Of these several materials, chlorosulfonated polyethylene and chlorinated polypropylene are prefeferred for use in the compositions of the invention. The chlorosulfonated polymeric materials described above are available commercially under the trade name "Hyoalon" (E.I. DuPont de Nemours & Co. The various types of Hypalon, e.g., Hypalon 30 which has a chlorine content of 43% and a sulfur content of 1.1% are described in detail in Data Booklet No. 1A entitled "Types of Hypalon Synthetic Rubber" by R. M. Staub which is available from E. I. DuPont de Nemours & Co.). Mixtures of these materials may also be employed.

The preferred chlorosulfonated polymer is chlorosulfonated polyethylene having from about 25% to 43% chlorine and about 1.0 to 1.4% sulfur.

The halogenated olefin polymers of the invention may, in general, be produced by the halogenation and/or halosulfonation of an olefin polymer employing a gaseous halogen and/or sulfur dioxide. Of course, any other method for production of these known materials may also be employed as desired.

The acrylic resins which are compounded with the abovedefined halogenated olefin polymers to form the adhesive compositions of this invention comprise in general those materials well known in the art as acrylic resins or polyacrylates, the monomer of which contains the characteristic vinyl grouping:

$$CH_2{=}C<$$

and which may be described as resinous polymers of esters of alpha, beta-ethylenically unsaturated monocarboxylic acids and saturated aliphatic alcohols containing from 1 to about 10 carbon atoms. Thus the monomers from which these esters are obtained may be described by the following general formula:

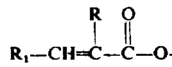

wherein R and $R_1$ are organic radicals and preferably hydrogen or methyl or straight or branched-chain alkyl groups of one to about ten carbon atoms and $R_2$ is an alkyl group of one to about ten carbon atoms.

Under polymerization conditions these acrylate monomers form resinous polyacrylates, which, in the case of the polymerization product of methyl acrylate, may be characterized as containing the following polymeric chain:

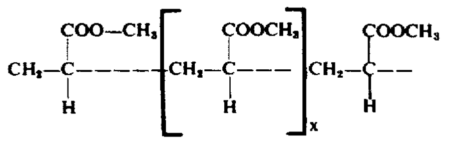

wherein $x$ is an integer representing the extent of polymerization.

Of the acrylate resins considered most applicable for the present invention and falling within the above general formula, there may be mentioned polymethyl methacrylate, polyethyl methacrylate, polypropyl acrylate, polybutylacrylate and the like. Mixtures, copolymers and interpolymers of these materials may also be employed.

Particularly preferred classes of acrylic resins for use in the compositions of this invention include the self-crosslinking resins described in U.S. Pat. No. 3,157,562, incorporated herein by reference.

The third primary ingredient utilized in forming the compositions of this invention comprises a suitable substantially water-soluble curing agent which is generally acid in character and has further been found to enhance the elasticity of the adhesive compositions. While any operable curing agent may be employed, the most preferred curing agents are the amine compounds such as thiourea, thiourethane, thioacetamide, thiopropionamide, thiocarbamate, sulfoamides, dithiocarbamic acid, tetramethyl thiuram disulfide, hexamethylenetetramine and the like.

Other amines which may be mentioned are the thiuram tetrasulfides, alkylene thioureas, 2-mercaptoimidazolines and 2-benzothiazyl disulfide. Moreover, mixtures of these materials may be employed if desired. Of these several compounds, thiourea, its N-substituted derivatives and mixtures thereof, constitute a preferred class of curing agents for the compositions of this invention. As indicated these curing agents are generally acid in character as is the entire system. For example, a 10% thiourea solution in water has a pH of about 5. In fact the entire adhesive compositions are acid in character.

In forming the compositions of this invention, the halogenated olefin polymer in uncured form is initially dispersed or dissolved in a non-aqueous suitable solvent by which means a "sol-type" solution is formed and an emulsifier is then added. The solvent employed for formation of the polymer sol solution may be any of the well-known aromatic hydrocarbon solvents such as xylenes, toluene, benzene, mixtures of high boiling aromatics such as Solvesso 100 and Solvesso 150, a series of mixed high boiling aromatic solvents whose properties are fully described and disclosed in the publication "Solvents Guide" by Marsden, 2nd Edition, (1963), page 501, the materials being sold under these trademarks by Esso, etc.; higher ketones such as methylethyl ketone, methylisobutylketone; halogenated hydrocarbons such as ethylene dichloride, dichloroethylene, methylene dichloride and the like. Mixtures of these solvents may also be employed to advantage in certain of the formulations.

After formation of the sol by dispersing or dissolving the halogenated olefin polymer in a suitable solvent, a small amount of an emulsification agent is added thereto. Any of the well-known emulsifiers may be employed which are suitable for forming emulsions of the water-in-oil type. However, particularly preferred emulsifying agents include morpholine or an ethylene oxide reagent sold commercially under the trade name IGEPAL CO 630 by GAF Corporation for an emulsifier comprising nonylphenoxypoly (ethyleneoxy) ethanol, described generally in "Handbook of Material Trade Names" by Zimmerman and Lavine, page 292, (1953), as a group of alkylphenolethylene oxide condensation products, and further described specifically in U.S. Pat. No. 3,296,167 (Example XV), and U.S. Pat. No. 3,232,785 (column 5). Also, emulsifiers such as ATPET, a series of surfactants sold by the Atlas Powder Co., (e.g. ATPET 200 which is a sorbitan fatty acid ester having an acid number of 8.0 max. a saponification number of 135–150, a hydroxyl number of 180–120 and a water content of 1.0 max. This material is descirbed in detail in the Product Information Bulletin available from Atlas Chemical Industries, Inc.) It is also described in "Handbook of Material Trade Names" by Zimmerman and Lavine, Supplement I, page 22 (1956). Also suitable is TWEEN 80, a sorbitan monooTeate sold under that trademark by Atlas Powder Co. and described in "Handbook of Material Trade Names" by Zimmerman and Lavine, page 587, (1953), as well as ALIPAL CO 433 and ALIPAL CO 436 which are sulfate esters of alkylphenoxy poly (ethyleneoxy) ethanol sold under those trademarks by Antara Chemicals and described for example in "Handbook of Material Trade Names" by Zimmerman and Lavine, Supplement III, page 10, (1960), emulsifiers such as polyoxyethylene fatty alcohol ethers, polyglycol fatty acid esters, oxidized fatty acid esters, polyol fatty acid monoesters, polyhydric alcohol fatty acid di-, tri-, etc. esters and the like may be employed. Mixtures of emulsifiers may also be employed.

After addition of the emulsifier, the curing agent and acrylic resin in aqueous solution form are emulsified into the basic sol solution. The curing agent and acrylic resin are preferably employed as aqueous solutions and when added or emulsified into the organic solvent sols, are believed to form a water phase on the interior of the emulsion although it is not proposed to be bound by this hypothesis.

The additions are preferably carried out while maintaining the materials in a conventional emulsifier or mixer having high shear action which may be maintained at about room temperatures or slightly higher. Such conventional apparatus include Brookfield, Eppenbach and Gabb emulsifiers or other apparatus considered suitable for emulsion formation.

As pointed out hereinabove, it is believed that the halogenated polymer organic sol is initially formed and the acrylic resin-water solution emulsified therein to form an emulsion apparently containing an interior water phase within an organic solvent outer phase. The solution which is initially formed, while termed a sol, (a colloidal solution) is actually believed to be a form of sol rather than a true sol in the commonly accepted sense of the word.

The belief that the instant solutions are not sols in the generally accepted sense of the word but rather are a form of sol is based on the fact that, while certain of the physical characteristics are indicative of sols, others are not. For example, the solutions are cloudy and show the characteristic that the stress, strain or flow relationship of the materials under pressure is a curve and not a straight line. In other words, the viscosity or "body" of the mass varies with the pressure.

However, by means of analyses it has been found that the particles contained in the instant solutions are not round as in ordinary sols but rather are elongated molecules in parallel coordination. Moreover, the solutions exhibit the characteristic of becoming fluid when shaken and coagulating again when left at rest, a property commonly known as thixotropy. Thus, the solutions of the invention may be more aptly described as "thixotropic sols."

The production of the instant solutions as a form of sol rather than as mere solutions or emulsions is an important feature of the present invention as it serves to increase the effectiveness of the final products as adhesive materials. This effect is attributed primarily to two results of the particles being distributed in extremely layer-like formation. First of all, this physical state makes for greater stability of the adhesive after application in that the solution remains more uniform than prior adhesives. Secondly, after curing of the adhesive, the constant layer formation of the particles makes for greater strength of the bond. These are important considerations in the adhesive art generally and especially in such textile operations as flocking where uniform bonding of the flock to the substrate is often difficult to achieve with conventional adhesives. This unique characteristic, because of the sol formation, increases surface tension and prevents the sols from penetrating into the fabric or substrate (flock or cloth) even in emulsions and retains the binder on the surface where it is needed and not in the interior of the fibers.

As suggested above, it is believed that on formation of the emulsions containing the normally incompatible resins of the instant invention, there is obtained a composition comprising an interior aqueous phase containing the acrylic ester and emulsifier and a continuous or exterior organic phase containing the halogenated olefin polymer. This is not to say that there are merely two layers present but that in the emulsion itself, each droplet will be found to contain the layer-like formation indicated. As indicated above, this layer-like physical state has been found to provide for greater stability of the final adhesive. Thus, the compositions of the present invention are considered to be distinct from the normally accepted definition of compositions such as dispersions.

In forming the emulsions of the instant invention, the following approximate amounts of each essential component should be employed:

| Component | Parts by Weight |
|---|---|
| Halogenated polymer | 20–80 |
| Acrylic resin | 15–75 |
| Curing Agent | 0.01–3.0 |
| Emulsifier | .05–3.5 |

In forming the emulsions the halogenated polymer should be dissolved in an excess of organic solvent or mixture of solvents wherein the amount of solvent used is preferably about two to four times the amount of polymer. The curing agent is preferably employed as a 5 to 25% solution in water and the acrylic resin is used as about a 30–60% solids in water.

As indicated above, in a further embodiment of the present invention there may also be employed in the instant formulations a formaldehyde and amine-containing precondensate resin. The inclusion of this resin in the mixture has been found to increase the toughness of the adhesive or polymer bond. Inclusion of these resins in the compositions therefore serve to enhance the toughness of the bond without having any adverse effect on the other properties of the system including its bond to a variety of substrates. Moreover, compositions wherein these thoughening resins have been incorporated have been found to improve the compositions when used in pigmented printing of flock adhesives.

Suitable precondensate resins which may be utilized in this aspect include the melamine-formaldehyde or urea-formaldehyde resin precondensates such as butylated melamine-formaldehyde condensate. triazine urea formaldehyde resins, and other aminoplast resins of this type which are well known in the art. Obviously mixtures of these resins may also be employed. Especially preferred classes of such resins which are available commercially are the line of resins sold under the trade name RESLOOM, by the Monsanto Company, as described for example in "Handbook of Material Trade Names" by zimmerman and Lavine, page 484, (1953), which are melamine-formaldehyde resins for textiles. Resloom 475, which is a butylated melamine-formaldehyde condensate of 50% solids solution in a mixture of 25% butanol and 25% xylene, having an acid No. less than 1, as described in Example XI, is a preferred material of this type. This material is described in detail in Publication No. 6116 available from the Monsanto Company. There may also be used the CYMEL resins, as described in "Handbook of Material Trade Names" by Zimmerman and Lavine, Supplement II, page 65, which are thermosetting melamine-formaldehyde resins available in solvents such as xylol and butanol and in "Synthetic Resins in Coatings", Part III, Preuss, page 14, (August, 1960). Also the AEROTEX resins of this type may be used, such as sold under that trademark by the American Cyanamide Company and as described in "Handbook of Material Trade Names" by Zimmerman and Lavine, Supplement II, pages 9 and 10 (1957).

When the precondensate resin is included in the compositions of the invention it is preferably utilized as an organic solvent or an aqueous mixture, there being sufficient liquid present to at least form a paste of the mixture. There may also be more liquid present so as to use the mixture as a solids solution or suspension.

The amount of precondensate employed will range from about 5 to about 30% by weight based on the total amount of solids in the mixture. In forming the formulations the aqueous mixture of the precondensate is preferably mixed with the acrylic resin aqueous mixture and emulsified into the organic solution containing the halogenated olefin polymer.

After formation of the emulsions of the invention according to the above-described procedure, they may be diluted by the addition or organic solvents or concentrated by the evaporation of a portion of the solvent present as desired to effect the final concentration of the adhesive composition. In any event, the organic solvent of course remains in the mixture.

After formation of the adhesive compositions of the invention they are merely applied as coating or films in the conventional manner. After application, the adhesive may be cured simply by air drying or, if superior resistance and strength is desired, ring by heating at about 300°F for about 2 to 5 minutes will suffice.

The resulting compositions may of course be further modified by the addition of various additional agents as modifiers including small amounts (0.01 to 2.0%) of stabilizers, dyes, waterproofing agents, mildew-proofing agents, thickeners, pigments and the like as is well known in the art. In many instances, it is advantageous to add dyes or pigments to color the compositions the same as the substrates to be bonded. Uses of such materials are of course well known in the art and need not be further described here.

The following examples illustrate preferred embodiments of the invention wherein parts are by weight unless otherwise stated.

EXAMPLE I

A solution was prepared by dissolving 500 grams of chlorosulfonated polypropylene in 800 ml. of Solvesso and 400 ml. xylene. This solution will be referred to hereinafter as solution A.

To 100 grams of solution A disposed in a Brookfield emulsifier, was added 5 grams of morpholine emulsifier. Thereafter, 15 grams of a 10% solution of thiourea in water was added to the cloudy solution. Finally, an acrylic resin dispersion consisting of 50 grams of a terpolymer of 75% ethylacrylate, 23% acrylonitrile and 2% N-methylol-acrylamide (40% solids in water) was added to the mixture at room temperature and the mixture emulsified.

The resulting solution was then thinly coated between two layers of cotton cloth and curing by air drying. On repeated washing and normal dry cleaning, the bond was found to remain fast and flexible without any sign of discoloration.

EXAMPLE II

To 100 grams of solution A from Example I in a Brookfield emulsifier was added 5 grams of IGEPAL CO 630 (General Aniline & Film) as an emulsification reagent. Thereafter, 20 grams of a 10% solution of thiourea in water was added followed by the addition of 50 grams of the acrylic resin dispersion used in Example I.

After application between two layers of cotton cloth and curing by air drying, a strong bond was obtained which remained fast and flexible after subjection to repeated washings and dry cleaning.

EXAMPLE III

The procedure of Example I was repeated except that 10 grams of ethylene thiourea was added in place of thiourea.

After application between two layers of cotton cloth and curing by air drying, a strong and secure bond was formed which was fast to washing and dry cleaning and showed no discoloration effects.

EXAMPLE IV

A sol solution was prepared by dissolution of 500 grams of chlorosulfonated polyethylene in 600 ml. of xylol, 600 ml. of toluol and 100 ml. of methylisobutyl ketone. This solution will be referred to in the following examples as solution B.

To 100 grams of solution B disposed in the Brookfield emulsifier maintained at room temperature was added 5 grams of morpholine emulsifier. Thereafter, 15 grams of a 10% solution of thiourea in water was added thereto. Finally, 50 grams of the acrylic resin dispersion of Example I (46% solids in water) was added to the mmixture at room temperature and the mixture was emulsified.

A portion of the resulting solution was then coated between two layers of cotton cloth in a thin sheet and cured by heating in an oven at 300°F. for 5 minutes. After repeated washing and severe dry cleaning, the bond was found to remain fast to the cloth and entirely flexible. No sign of discoloration could be detected.

EXAMPLE V

To 100 grams of solution B in the emulsifier was added 5 grams of IGEPAL CO 630 emulsification reagent. Then, 20 grams of a 10% solution of thiourea in water was added followed by 50 grams of the acrylic resin dispersion of Example I (46% solids in water) and an emulsion formed.

After application between two layers of cotton cloth as a thin coating and curing by air drying, a strong bond was obtained which remained fast to the material and in a flexible condition after repeated washing and dry cleaning.

EXAMPLE VI

The procedure of Example V was repeated except that 10 grams of ethylene urea was added in place of the thiourea. On application to the cloth and curing by air drying, a strong and flexible bond was obtained which was fast to washing and dry cleaning and exhibited no discoloration tendencies.

EXAMPLE VII

The procedure of Example IV was repeated except that, after coating the cloth, the adhesive was cured by drying in an oven at 300°F. for 5 minutes. The resultant laminate was then subjected to repeated severe dry-cleaning procedures including the generous use of perchlorethylene, the conventional solvent employed in dry-cleaning procedures. The bond remained strong and flexible and showed no hint of discoloration.

EXAMPLE VIII

A sol solution was prepared by dissolution of 800 grams polypropylene chloride (Parlon P - Hercules Powder Co. ) in 1000 ml. xylene and 100 ml. methylisobutylketone. This solution will be referred to in the following examples as solution C.

To 100 grams of solution C disposed in the Brookfield emulsifier maintained at ambient temperature was added 5 grams of morpholine emulsifier. Thereafter 10 grams of a 10% solution of thiourea in water was added thereto. Then, 50 grams of the acrylic resin dispersion of Example I (46% solids in water) was added at room temperature and the mixture emulsified.

A portion of the resulting solution was coated between two layers of cotton cloth and cured by air drying. On repeated washing and dry cleaning, the bond was found to remain fast and flexible and no discoloration thereof discerned.

EXAMPLE IX

To 100 grams of solution C in the emulsifier was added 5 grams of IGEPAL CO 630 emulsifier. Then 20 grams of a 10% solution of thiourea in water was added followed by 50 grams of the acrylic resin dispersion of Example I (46% solids in water) and an emulsion formed.

After application between two layers of cotton cloth as a thin coating and curing by drying in an oven at 300°F. for 5 minutes a bond was formed which remained secure and flexible after repeated severe dry-cleaning.

EXAMPLE X

The procedure of Example VIII was repeated except that 15 grams of an ethylene thiourea aqueous solution was employed as the curing agent. After coating between the cotton cloth and curing by air drying, a strong and flexible bond was formed which remained so after washing and dry cleaning.

The same results were obtained when the above adhesive solutions were coated between two layers of a synthetic material, specifically sheets of polyethylene, nylon, orlon and acrylan. Thus, the compositions are as effective when applied to synthetics as with cellulosic materials.

The following examples illustrate the invention when the composition also contains a precondensate resin.

EXAMPLE XI

The following solutions were prepared by mixing each of the following solutions:

A. 28.67 pounds of:
- 8.99% Methylisobutyl Ketone
- 24.28% Xylene
- 39.88% Solvesso 150 (Available from Esso)
- 26.95% Chlorousulfonated polyethylene (Hypalon 30)

B. 26.04 pounds of:
- 4.87% Methylisobutyl Ketone
- 58.66% Xylene
- 36.47% Chlorosulfonated polyethylene (Hypalon 30)

C. 37.71 pounds of:
12.14% Chlorosulfonated polyethylene (Hypalon 30)
15.08% Xylene
24.03% Solvesso 150
48.71% Rutile Titanium Dioxide
0.04% Ultramarine Blue (ground on roller mill)
D. 14.80 pounds
Solvesso 150
E. 1.05 pounds
Atpet 200 (emulsifier-Atlas Chemical)

The above materials are mixed and the solution is agitated vigourously and into the solution are emulsified the following materials:

17.47 pounds of:
the acrylic resin dispersion of Example I (46% solids in water) containing 3 ounces of Thiourea per gallon
6 gallons (51.60 pounds) of:
the acrylic resin dispersion of Example I (46% solids in water)
12.45 pounds
Resloom 475 (butylated melamine-formaldehyde condensate of 50% solids solution in a mixture of 25% butanol and 25% xylene — sold by Monsanto Chemical)

After the above emulsified mixture was formed, a portion thereof was thinly coated between two layers of cotton cloth and cured by air drying. The bond remained strong and flexible after repeated washing and dry cleaning. In use as an adhesive for flocking, the bond was determined to be strong and stable.

EXAMPLE XII

An emulsified solution containing the following ingredients was prepared. This solution was formed from:

49.14 pounds of:
8.99% Methylisobutyl Ketone
24.18% Xylene
39.88% Solvesso 150
26.95% Chlorosulfonated polyethylene
0.5 pounds
Atpet 200 (Atlas Chemical - emulsifier)
3.35 pounds
Varsol No. 2 (Esso) an aliphatic hydrocarbon solvent as described in Marsden "Solvents Guide," Second Edition, page 548 (1963), TP 247.5M3.

There was then added 20.72 pounds of the following pastes:

7-½ gallons Solvesso 150
24 ounces Atpet 200 emulsifier
10 gallons the acrylic resin emulsion of Examples I (46% solids in water) (add slowly) and
75 pounds ground Calcium Carbonate powder (stirred in)

This pigment paste was then passed through a conventional three roller mill and there was added thereto:

1 gallon of a methyl acrylate emulsion containing 3 ounces Thiourea previously dissolved therein.

After the above mixtures was formed the solution was agitated vigorously and there was emulsified thereinto the following materials:

1-½ gallons the acrylic resin emulsion of Example I (46% solids in water)
1-¾ gallons Resloom 475
2 ounces per gallon pigment paste-ground on three roller mill:
80% yellow lead chromate powder 5% Alkyd 2477 (the trade name of the Valchem Division of United Merchants and Manufacturers, Inc. for the unmodified castroroil-phthalic anhydride polyester resin, having a phthalic content of 35% by weight and an acid number of 6 prepared as a 50% solids solution in xylene)
15% Solvesso 150

After the emulsion was finalized, a portion thereof was used in the pigmented printing of flock adhesives with curing of the adhesive being effected by air drying. The bond achieved was tough and durable.

It is to be understood that the ingredients of the adhesive compositions of this invention may be varied without departing from the scope of the invention. Thus, variations in the properties thereof may be obtained by the use of other emulsifiers or mixtures of the same, the addition of pigments or dyestuffs to form a bond conforming to the color of the substrates or the addition of solvents to swell the substrates.

Similarly, variations in the amount and type of the acrylic resin additives are contemplated as well as the further addition of vinyl resins or polyesters as desired. Hence, the use of these several materials are considered to fall within the scope of the invention.

Variations and modifications may, of course, be made, without departing from the spirit and scope of the present invention. Having thus described our invention we desire to secure and claim by Letters Patent is:

I claim:

1. An adhesive composition in a water-in-oil emulsion form, comprising as the exterior continuous phase, a solution of about 20–80 weight percent of a chlorinated polyolefin selected from a group consisting of chlorosulfonated polyethylene having from 25 to 43 percent chlorine and 1.0 to 1.4 percent sulfur and polypropylene chloride having at least 65 percent chlorine in an organic solvent; an interior dispersed phase comprising an aqueous dispersion of about 15 to 75 weight percent of a resinous acrylic ester formed by polymerization of a monomer which may be described by the following general formula:

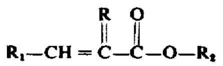

wherein R and $R_1$ are hydrogen, methyl or alkyl groups of 1 to about 10 carbon atoms, and $R_2$ is an alkyl group of 1 to about 10 carbon atoms, and mixtures thereof, about 0.05 to 3.5 weight percent of a water-in-oil emulsifying agent and about 0.01 to 3.0 weight percent of an acidic water-soluble curing agent.

2. An adhesive composition according to claim 1 wherein the acrylic ester is selected from the group consisting of polymethyl methacrylate, polyethyl methacrylate, polypropyl acrylate, polybutylacrylate and mixtures thereof.

3. An adhesive composition as defined in claim 2 including as a toughening agent a member selected from the group consisting of melamine-formaldehyde and urea-formaldehyde precondensates employed in the range of from about 5% to about 30% by eight based on the total amount of solids in the mixture.

4. A composition according to claim 3 wherein the chlorinated polymer is chlorosulfonated polyethylene containing 43 percent chlorine and 1.1 percent sulfur or polypropylene chloride, the solvent is toluene or xylene, the acrylic ester is polymethyl methacrylate, and the emulsifying agent is morpholine, the curing agent is thiourea or ethylene thiourea and the toughening agent is a butylated melamine-formaldehyde precondensate.

* * * * *